(12) United States Patent
Sjöö

(10) Patent No.: US 6,609,859 B1
(45) Date of Patent: Aug. 26, 2003

(54) CERAMIC CUTTING INSERT

(75) Inventor: Sture Sjöö, Gävle (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/555,569

(22) PCT Filed: Dec. 3, 1998

(86) PCT No.: PCT/SE98/02220
§ 371 (c)(1),
(2), (4) Date: Jul. 13, 2000

(87) PCT Pub. No.: WO99/30860
PCT Pub. Date: Jun. 24, 1999

(30) Foreign Application Priority Data

Dec. 3, 1997 (SE) ................................................ 9704482

(51) Int. Cl.⁷ ........................... B23B 27/14; B23P 15/28
(52) U.S. Cl. ........................ 407/103; 104/113; 104/119
(58) Field of Search .................. 407/104, 103, 407/102, 107, 112, 120, 113, 114, 115, 116, 117, 118, 119

(56) References Cited

U.S. PATENT DOCUMENTS

| | | | | |
|---|---|---|---|---|
| 3,662,444 A | * | 5/1972 | Erkfritz | 407/104 X |
| 4,430,031 A | * | 2/1984 | Hellstrom | 407/104 |
| 4,475,851 A | * | 10/1984 | Hali | 407/113 |
| 4,477,212 A | * | 10/1984 | Kraft | 407/104 |
| 4,615,650 A | * | 10/1986 | Hunt | 407/105 |
| 4,697,963 A | | 10/1987 | Lück | |
| 4,963,061 A | * | 10/1990 | Katbi et al. | 407/114 |
| 5,141,367 A | * | 8/1992 | Beeghly et al. | 407/119 |
| 5,147,158 A | * | 9/1992 | Riviere | 407/113 |
| 5,314,269 A | * | 5/1994 | Arail et al. | 407/42 |
| 5,685,672 A | | 11/1997 | Tjernström | |
| 5,820,311 A | * | 10/1998 | Grun et al. | 407/102 |
| 5,957,629 A | * | 9/1999 | Hessman et al. | 407/113 |
| 6,017,172 A | * | 1/2000 | Ukegawa et al. | 407/113 |

FOREIGN PATENT DOCUMENTS

| | | | |
|---|---|---|---|
| DE | 4209084 | | 9/1993 |
| JP | 1-310808 | * | 12/1989 |
| JP | 11-77408 | * | 3/1999 |

* cited by examiner

Primary Examiner—Henry W. H. Tsai
(74) Attorney, Agent, or Firm—Burns, Doane, Swecker & Mathis, LLP

(57) ABSTRACT

The invention relates to a ceramic cutting insert for cutting tools of the type which include a clamp with a nose intended to grip into a recess (5) in the cutting insert in order to keep the cutting insert firmly in place in an insert seat in a tool holder. The recess (5) has a rotationally symmetrical shape and comprises an inner cavity (18) which is delimited by a cylindrical or slightly conical wall surface (19) said cavity extends from the far end of the inner cavity and expands outwards by ever increasing its diameter in the direction from the inner cavity to the entrance opening in the said upper or lower sides.

13 Claims, 6 Drawing Sheets

CERAMIC CUTTING INSERT

FIELD OF THE INVENTION

Figure 1:
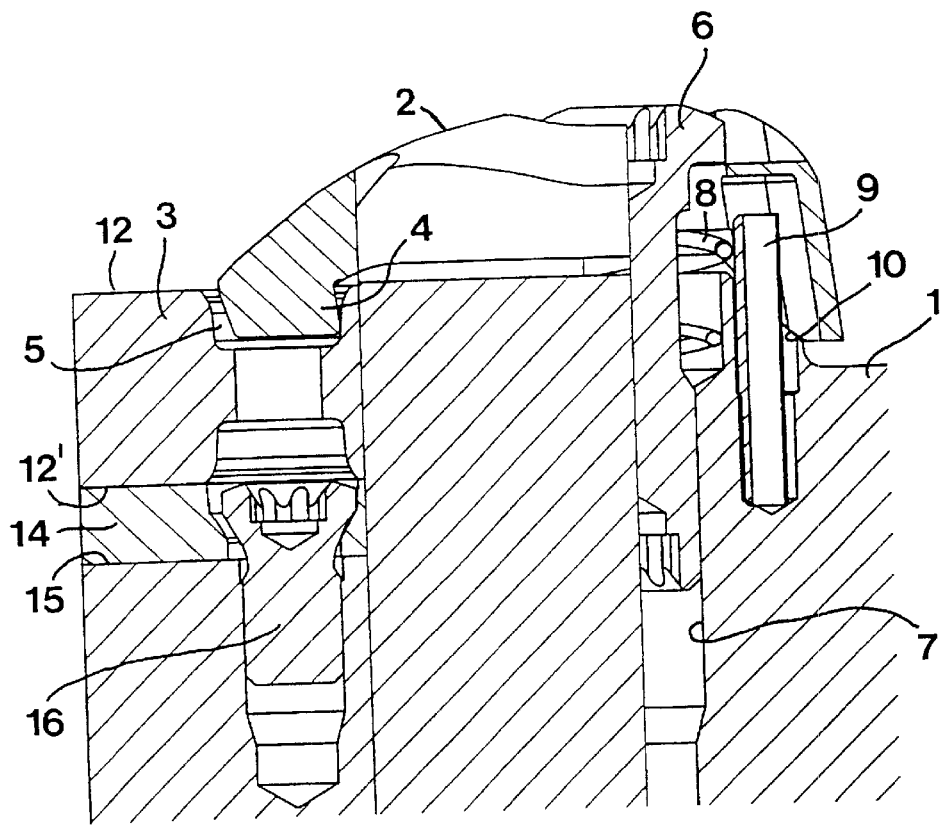

The present invention relates to a ceramic cutting insert for a cutting tool of the type which comprises a tool holder with a seat intended to accept the cutting insert, the shape of which partially corresponds to that of the cutting insert, and a clamp which is connected to the holder via a screw. The object of the clamp is to clamp the cutting insert firmly in the seat, said clamp features a nose provided to grip into one of the two recessed openings on opposite upper and lower sides on the cutting insert so that when the screw is tightened the cutting insert is drawn into the seat so that at least one side surface of the insert is tightly pressed against a corresponding side surface of the seat.

BACKGROUND OF THE INVENTION

A cutting tool, including a cutting insert and a tool holder in general of the type described above, is earlier known through SE 9401822-3. In this case the recess in the cutting insert has the form of a transverse, cylindrical hole, which like the nose of the clamp is generally cylindrical in shape, although inclined in relationship to the cylindrical hole in the cutting insert. The length of the nose is relatively large, whereby the point of contact between the nose and the cylindrically shaped inner wall of the hole is located relatively far down in the hole. This cutting tool has been found to work largely without problems in practical use.

Another cutting tool is known from EP 0 074 601. In this case the recess in the cutting insert has the shape of an comparatively shallow recess with a basic shape of either a four leaf clover or a figure eight, at the same time the nose of the clamp has a half cylindrical or half barrel like shape, whereby the longitudinal extension of the nose is oriented at right angles to the actual longitudinal extension of the clamp. Through this design a point contact is attained between the nose and the inside surface of the recess. A drawback with this design, however, is that the longitudinal extension of the clamp must always be located in the direction of the bisector between diametrically opposite corpers on a quadrilateral shaped cutting insert, e.g. a square or rhombic shaped insert. For this reason cutting tools of this type are difficult to use in machines where two or more cutting inserts are to be placed near each other.

Irrespective of the type of tool the cutting insert is always a replaceable component with a limited life, whilst the tool holder is of a more long-lived character. In practice the cutting insert can thus have an effective life of some few hours, while the life of the tool holder can extend to months or years. Different types of cutting tools are found on the market. Machine owners must often have different types of tolls to remove different types of inserts. This causes both organizational as well as logistical problems because the different types of cutting inserts and their corresponding clamping tool are often made by different manufacturers.

SUMMARY OF THE INVENTION

The aim of the present invention is to solve the above-mentioned problem by creating a new cutting insert for both types of tool. A basic purpose of the present invention is thus to create a ceramic insert which can be used universally for cutting tools according to both SE 9401822-3 and EP 0 074 601 and which furthermore permits the use of variable adjustments of the angular position of the clamp relative to the insert even in those cases when the tool is of the type which is described in EP 0 074 601. An additional purpose is to create a ceramic insert, which lends itself to an easy and economic method of manufacture despite the fact of its ability to fit into both types of tool.

According to one aspect, the present invention provides a ceramic cutting insert for a cutting tool which comprises a holder (1) with an insert seat intended for the acceptance of the cutting insert (3), and a clamp (2) which is connected to the holder to firmly clamp the cutting insert in the seat, said clamp (2) features a nose (4) provided to grip into one of two recesses (5) which have their openings on opposite upper and lower sides (12, 12') of the cutting insert in order to pull the cutting insert into the insert seat and press tightly at least one side surface in the insert seat wherein the recess (5) has a rotational symmetrical shape an comprises an inner cavity (18) which is delimited by a cylindrical or slightly conical wall surface (19), said cavity extends from the inner cavity and expands outwards by an ever increasing diameter in the direction from the inner cavity to the entrance opening in one of the upper or lower sides (12, 12'), and an external cavity (20) is delimited by at least two ring shaped partial surfaces which extends between the inner cavity (18) and the conical surface (21).

BRIEF DESCRIPTION OF THE DRAWING FIGURES

Figure 2:
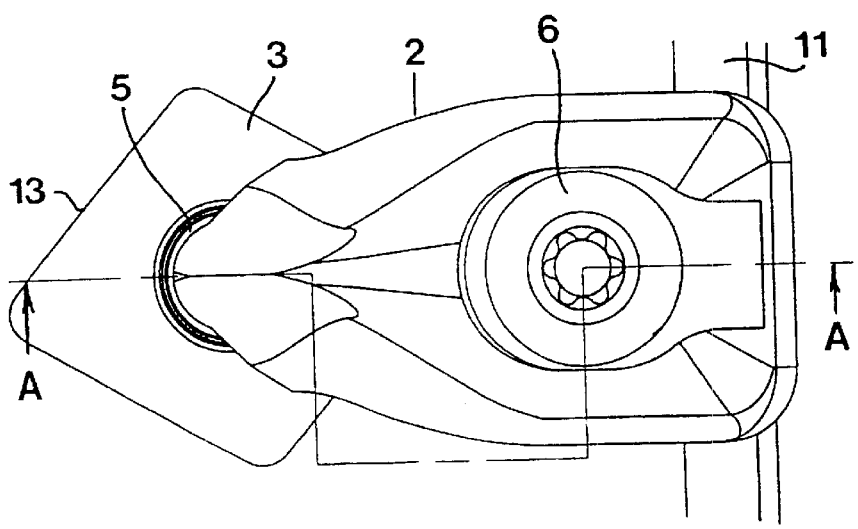
Figure 3:
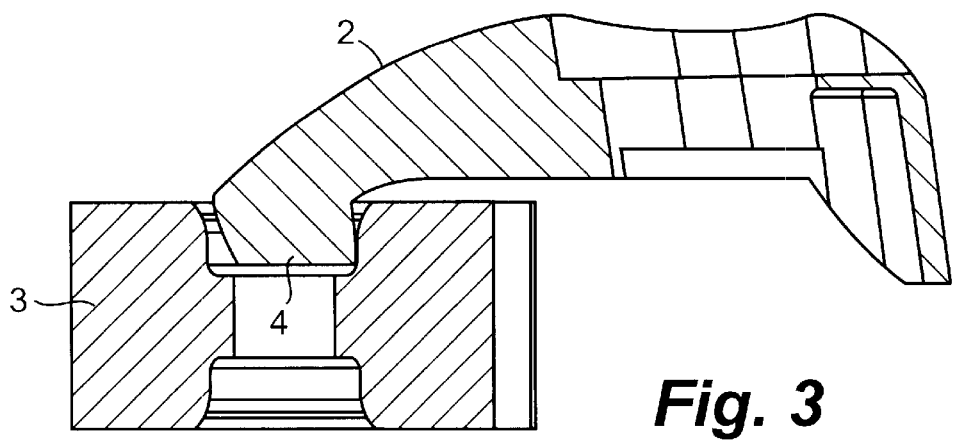
Figure 5:
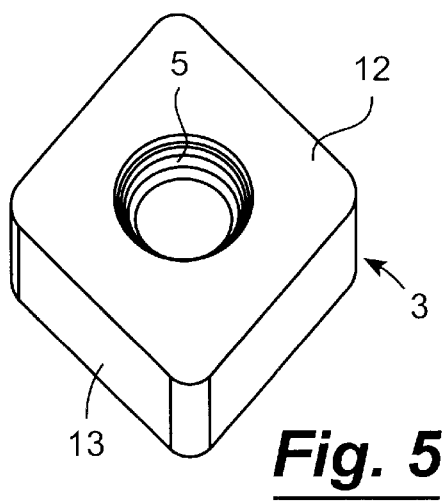
Figure 6:
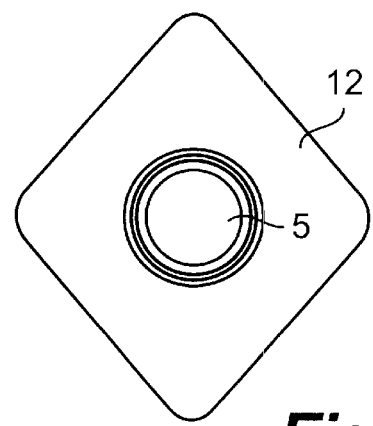
Figure 7:
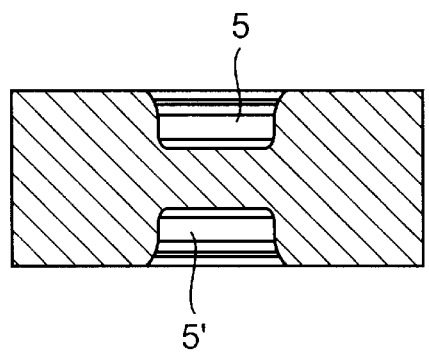
Figure 4A:
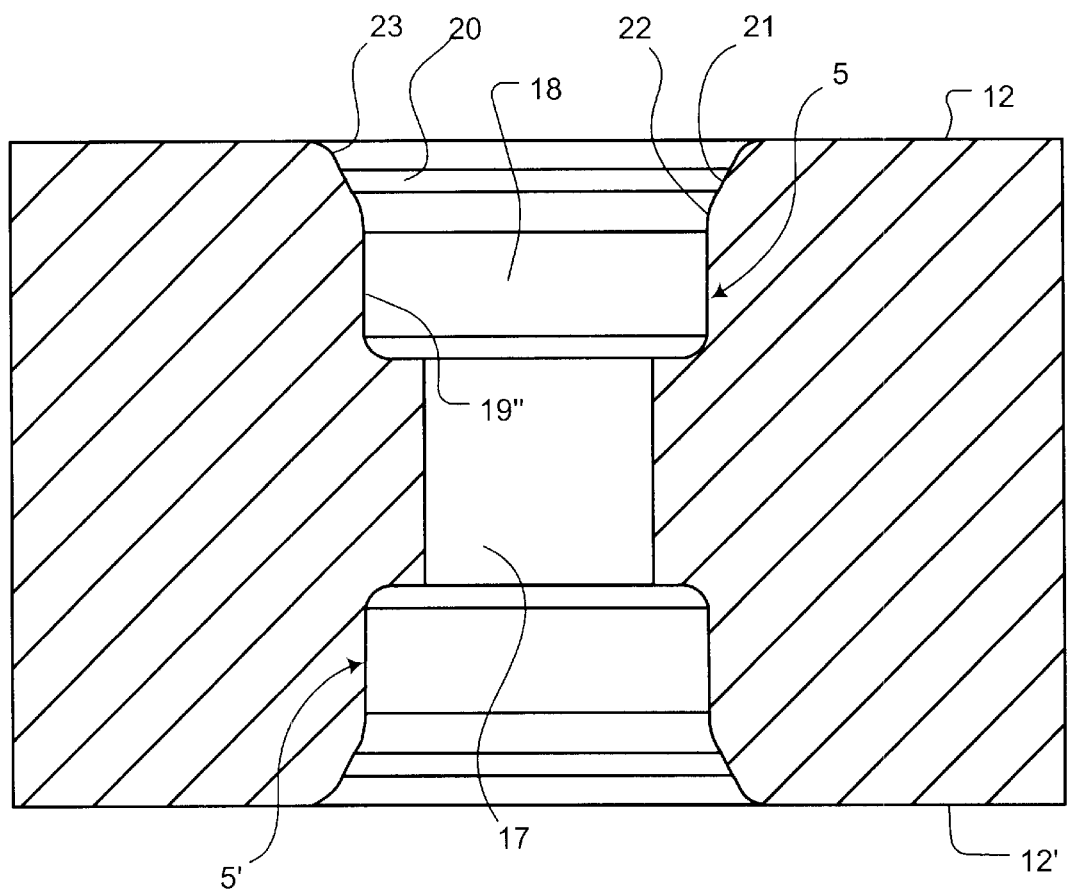
Figure 4B:
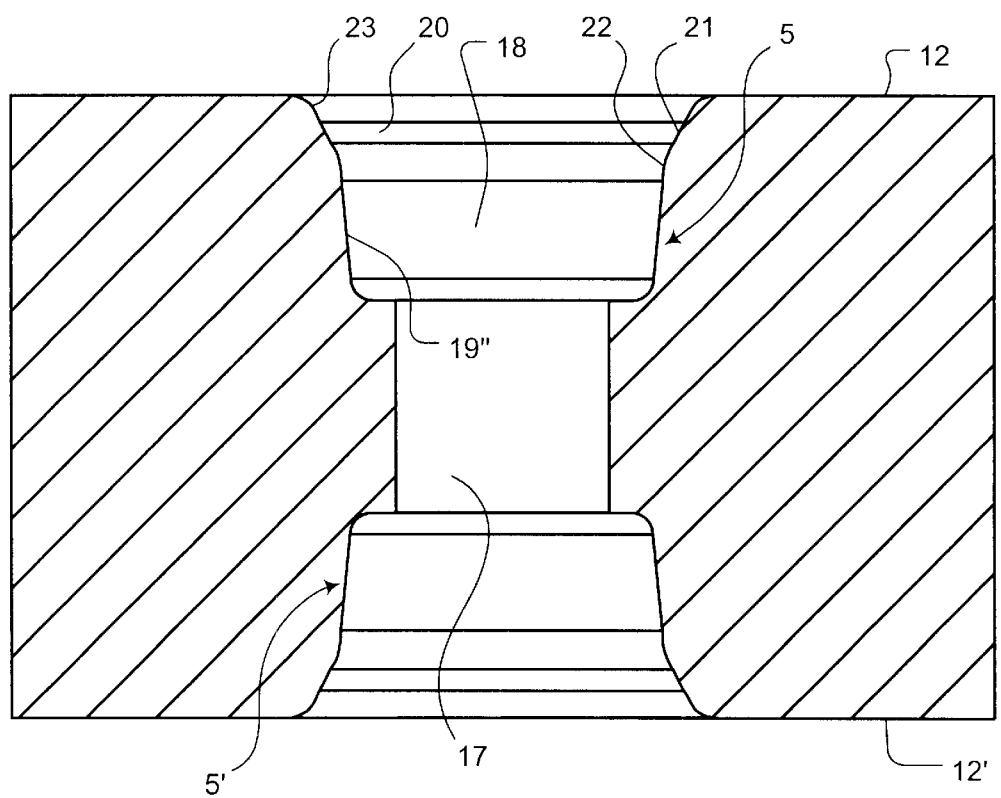
Figure 8:
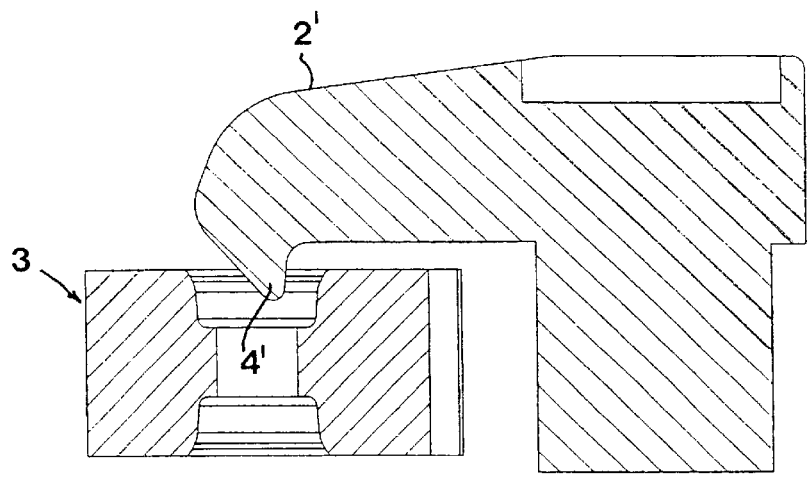

The drawings are comprised of:

FIG. 1 a partial longitudinal section (A—A in FIG. 2) through a tool according to SE 9401822-3, FIG. 2 a plan view from above of the clamp of the tool and the cutting insert according to the invention co-operating therewith, FIG. 3 a longitudinal section through only the actual clamp and a cutting surface insert according to the invention co-operating therewith, FIG. 4a an enlarged longitudinal section through the cutting insert according to an embodiment of the invention, FIG. 4b an enlarged longitudinal section through the cutting insert according to an embodiment of the invention, FIG. 5 a perspective view of a cutting insert in accordance with the invention, FIG. 6 a plan view of the cutting insert in accordance with the invention, FIG. 7 a longitudinal section through an alternative embodiment of the cutting insert according to the invention, FIG. 8 a schematic longitudinal section through a clamp to the tool according to EP 0 074 601 in cooperation with the cutting insert of the invention.

Figure 9:
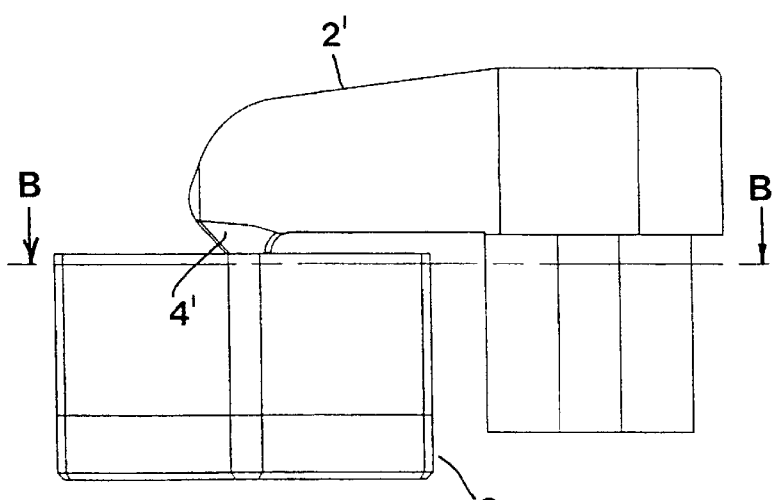
Figure 10:
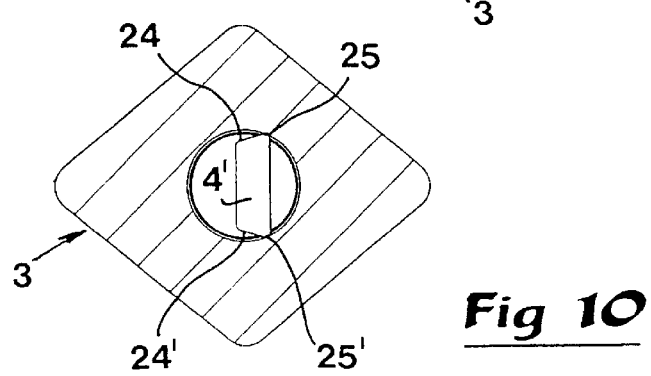
Figure 11:
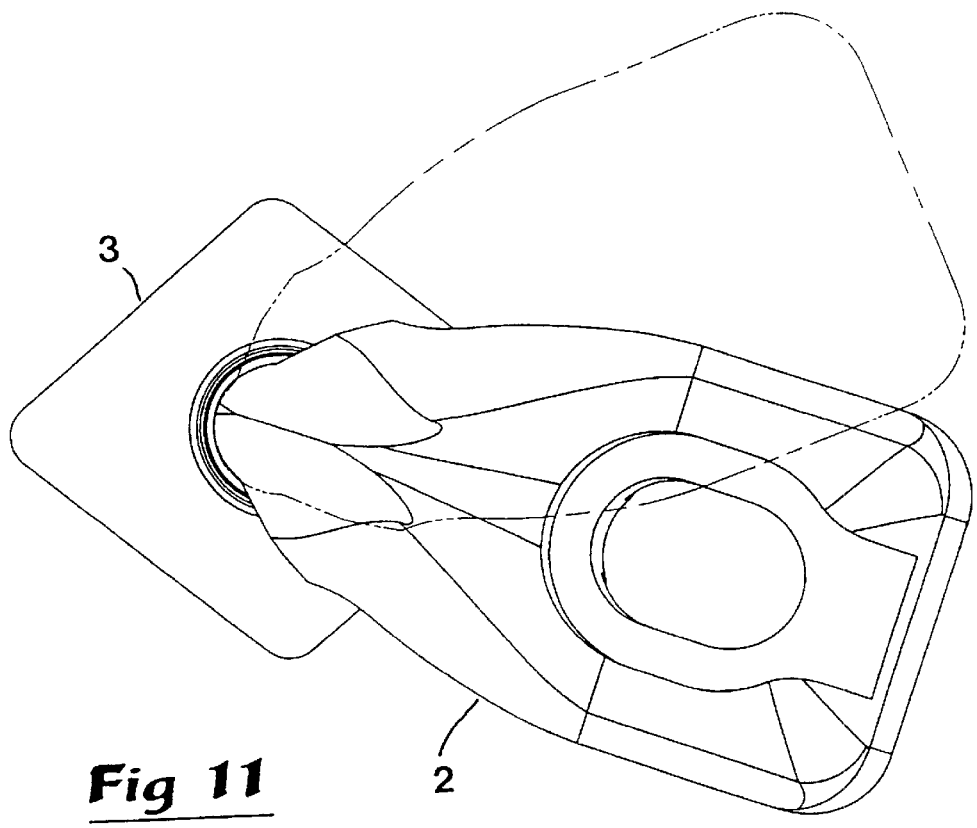
Figure 12:
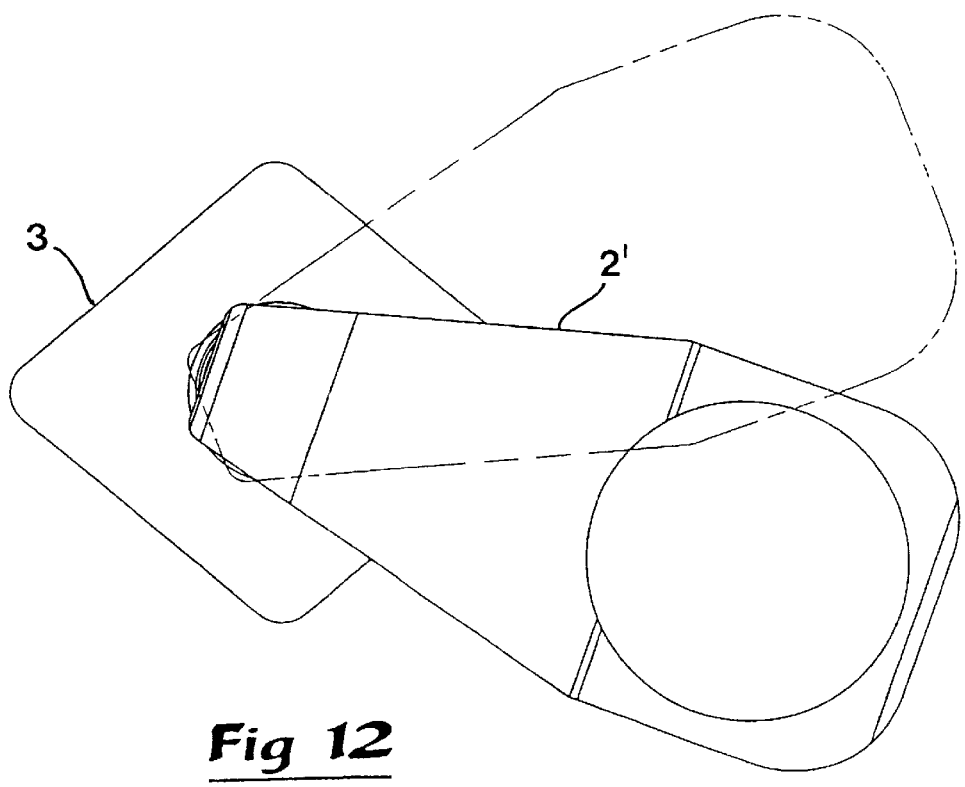

FIG. 9 a schematic side view of the clamp and the cutting insert according to FIG. 8, FIG. 10 a planar section (B—B in FIG. 9) through the cutting insert alone, FIG. 11 a planar view illustrating how the clamp on the tool according to SE 9401822-3 can be installed in different angles relative to the insert, and FIG. 12 a corresponding planar view showing also how the clamp on the tool according to EP 0 074 601 in analogous manner allows itself to be oriented in different positions relative to the cutting insert.

DETAILED DESCRIPTION OF PREFERRED EMBODIMENTS OF THE INVENTION

The cutting tool produced according to SE 401822-3 as illustrated in FIGS. 1 and 2 includes three main components, that is to say a holder 1, a clamp 2 as well as a cutting insert 3. The cutting insert 3 is made of a ceramic material, while the holder and clamp are customarily made of steel. The clamp 2 has an elongated basic shape and features at an external, free end a nose 4 which has as its function to lock into a recess, which is designated 5, in the cutting insert 3. This nose has a cylindrical basic shape, however the nose is inclined relative to the longitudinal or center axis of the recess. The clamp is linked to the holder 1 via a screw 6 which can be screwed down into a threaded hole 7 in the holder, and more exactly against the effect of a spring 8 which strives to lift the clamp towards an outer position. A pin 9, acts as a stop and ensures that the clamp does not twist itself as the screw is tightened. In the region of its rear end the clamp features an inclined surface which abuts against a surface 11 on the holder 1 which is inclined in a similar manner. Through co-operation between these surfaces 10, 11, as the screw is tightened, the nose 4 is not only pressed in a downwards direction but it also moves in a rearward direction in order to draw the cutting insert 3 into a seat in the holder 1.

Said seat has a shape, which partially corresponds to that of the cutting insert, however this is not illustrated in go the drawings. In the example given according to FIGS. 1–2, the cutting insert 3 has a polygonal, more specifically a rhombic basic shape, wherein same is delimited by planar upper and lower sides 12, 12' plus four side faces 13. However it should be pointed out that the insert may have other base shapes, for example square or circular. The example also shows how a shim 14 may be introduced between the cutting insert 3 and the bottom 15 of the insert packet. This shim is held in place with the help of a screw 16.

As far as the illustrated cutting tool has been described so far it is the same in all significant features as has been known earlier from SE 9401822-3.

Now reference is made to FIGS. 3–6, which illustrate in more detail a first embodiment of the cutting insert according to the invention. The invention is described by way of example in connection with an indexable cutting insert. For this reason the cutting insert includes two opposite recesses 5, 5' designed to receive the nose 4 of the clamp finger 2. Recesses 5, 5' are diametrically opposite each other, in addition an open channel 17 extends between them.

Characteristic for the cutting insert according to the invention is that the individual recesses 5, 5' have a rotationally symmetrical shape and comprise partly an inner cavity 18 which is delimited by a cylindrical surface 19' as shown in FIG. 4a, or a slightly conical surface 19" as shown in FIG. 4b, partly an external cavity 20 which extends from the far end of the inner cavity and expands outward by ever increasing its diameter in the direction from the inner cavity to the entrance opening in the upper surface 12 (respectively to the bottom side 12') of the insert. The external cavity 20 is delimited by at least two ring-shaped partial surfaces, namely a first, conical surface portion 21 and a second, convex dome-shaped surface portion 22, which extends between the inner cavity 18 and the conical surface 21. In the particular preferred embodiment which is shown in the drawings the external cavity 20 is delimited also by a third surface portion 23 in the shape of an convex dome-shaped surface portion which extends between the conical surface 21 and the planar upper surface 12 (respectively the bottom surface 12') on the cutting insert.

As is distinctly shown in FIG. 3 the comparatively long nose 4 on the clamp finger will come to abut against the inner surface wall 19' of the cavity 18 when achieving point or linear contact between the nose and surface wall. Of course, the inner wall surface may include a cylindrical surface 19" instead of the slightly conical surface shown. Hereby a distinct and reliable transfer of the required forces from the clamping finger and nose to the insert is attained in connection with the insert being drawn into its corresponding seat in the tool holder.

The alternative embodiment of the cutting insert, which is shown in FIG. 7, differs from the cutting insert described above in that the transverse channel 17 is lacking. In this manner the two recesses 5, 5' are separated by a central portion of material. This means that the cutting insert—for a given dimension—contains more material and thereby has greater strength.

Now reference is made to FIGS. 8–10 which illustrates schematically a clamp of the type which is part of the cutting tool according TO EP 0 074 601. Basically this clamp differs from the clamps shown in FIGS. 1 and 3 in that the nose 4' has a half cylindrical or half barrel like shape. As is shown FIG. 10 the nose is long and narrow and extends with its longside at right angles to the clamp's 2' longside. The opposed side faces 24, 24' on the nose narrow off not only in the forward direction, as is shown in FIG. 10, but also in the downwards direction (which is not apparent from FIG. 10).

When the nose 4' is brought to engage in the recess 5 of the cutting insert and the screw of the clamp is tightened, point contact is obtained. More exactly, point contact is obtained at two points 25, 25' between the nose and at least one of the partial surfaces which delimits the outer cavity 20 of the recess. More exactly, two point contact will occur against the conical partial surface 21 or the dome-shaped partial surface 22 which exist between the conical surface and the wall surface, 19' or 19", which delimits the inner cavity 18; all being dependent on the condition of the nose regarding, for example, the degree of wear. Even in this case a distinct pressing of the nose against the inside of the recess is attained, namely against the partial surfaces in the external cavity. Since the cavity has a rotationally symmetrical shape it is ensured that the point contact is attained irrespective of the clamp's angular position relative to the insert. This is clearly shown in FIG. 12 which illustrates how the clamp 2' can be installed in different positions in relation to the cutting insert (and vice versa). The only purpose of FIG. 11 is to clarify that the same variation of the angular position can happen at clamp 2 according to SE 9401822-3.

The cutting insert according to the invention can be manufactured in different versions with mutually different dimensions. In practice the cutting insert can have a thickness of the magnitude of 5–7 mm. Generally the diameter of the inner cavity 18 varies in accordance with the thickness of the insert. If the cutting insert is thin this diameter can be of the order of up to 3.8 mm. If the cutting insert is thick the diameter can be up to 6.5 mm. In a medium thickness embodiment the diameter of the cavity 18 can be up to about 5 mm. Further the depth of the cavity 18 can vary in accordance with the dimensions of the cutting insert. In a medium thickness cutting insert with a diameter of 5 mm can the depth of the cavity 18 be of the order of 0.8–1.2 mm, preferably about 1 mm. Even the depth of the external cavity 20 can vary, as can the depths of the separate partial surfaces 21, 22 and 23. In practice the external cavity 20 can have a total depth of the magnitude of 0.8–1.5 mm, suitably 1.0–1.3 mm. Both the partial surfaces 22, 23 can have about just as large a depth, e.g. in the range of 0.3–0.6 mm, suitably 0.4–0.5 mm, whilst the intermediate partial surface 21, has a shallower depth, e.g. in the range of 0.25–0.5 mm, suitably 0.3–0.4 mm. In practice the total depth for the different partial surfaces 21, 22 and 23 can be about just as great as the depth of the inner cavity 18.

Regarding the conical surface 21 it should be pointed out that the angle of the cone could lie in the range of 35–55°. However the lower limit can be larger than 35°, e.g. 40° or 42°. In an analogous manner the upper limit can be less than 55°, e.g. 50° or 48°. In practice a cone angle of 45–46° is preferred.

The radius of curvature of the external dome-shaped partial surface 23 can amount to about 1 mm, whilst the radius of curvature of the inner dome-shaped partial surface 22 can lie in the range of 0.7–1.0 mm.

A significant advantage with the cutting insert according to the invention is that the insert can be used universally in cutting tools according to both SE 9401822-3 and EP 0 074 601. To make doubly sure, the cutting insert furthermore allows the clamp to be angled relative to the bisector of a polygonal or square cutting insert; something which is not possible when using inserts according to EP 0 074 601. This means that machine owners who use both types of cutting tool can use one and the same cutting insert throughout and in this manner avoid costly difficulties with regard to tool stocks and other organizational problems in connection with the supply of cutting inserts for the tools.

What is claimed is:

1. Ceramic cutting insert for a cutting tool which comprises a holder with an insert seat intended for the acceptance of the cutting insert, and a clamp which is connected to the holder to firmly clamp the cutting insert in the seat, said clamp includes a nose provided to grip into one of two recesses which have their openings on opposite upper and lower sides of the cutting insert in order to pull the cutting insert into the insert seat, wherein the recess has a rotational symmetrical shape and comprises:

an inner cavity which is delimited by a cylindrical or slightly conical wall surface;

an external cavity extending from the inner cavity and expanding outwards by a smoothly ever-increasing diameter in a direction from the inner cavity to an entrance opening in one of the upper or lower sides, wherein the external cavity is delimited by at least two ring shaped partial surfaces located between the inner cavity and the one of the upper or lower sides, and wherein the at least two ring-shaped surfaces comprise a first conical surface and a second convex dome-shaped surface that shares its boundary with the first conical surface.

2. Ceramic cutting insert according to claim 1, wherein the external cavity is also delimited by a third, convex dome shaped surface which extends between the conical surface and the one of the upper or lower sides of the cutting insert.

3. A ceramic cutting insert comprising:

a first recess extending from an opening in an upper side surface;

a second recess extending from an opening in a lower side surface and having a central axis in common with the first recess; and an open channel interconnecting and extending between the first and second recess and having a diameter smaller than a diameter of the first and second recess, wherein at least one of the first and second recesses comprises:

an inner cavity delimited by a surface having a form chosen from the group of cylindrical and slightly conical; and an external cavity comprising a conical partial surface, wherein one end of the external cavity is contiguous with the inner cavity and extends from an end of the inner cavity surface with a smoothly ever-increasing diameter in a direction along the central axis to the opening in the at least one of the upper or lower surfaces.

4. A ceramic cutting insert comprising at least one recess extending from an upper or lower side surface, the at least one recess comprising;

an inner cavity delimited by a surface having a form chosen from the group of cylindrical and slightly conical; and an external cavity extending from an end of the inner cavity and extending outwardly with a smoothly ever-increasing diameter to an opening in one of the upper or lower surfaces, wherein the external cavity is delimited by a conical surface portion situated between a first convex dome-shaped surface portion and a second convex dome-shaped surface portion.

5. A cutting insert for a cutting tool, comprising:

an upper surface;

a lower surface; and a first recess extending from one of the upper or the lower surface, the recess for receiving a cutting tool clamp portion directed into the recess from the one of the upper or lower surface to secure the cutting insert to a cutting tool holder, the first recess comprising:

a first cavity part; and a second cavity part extending from one end of the first cavity part, wherein the second cavity part includes a conically-shaped surface portion and at least one convex-shaped surface portion, and wherein a diameter across the second cavity part is smoothly ever-increasing with distance from the one end to the one of the upper or lower surface.

6. The cutting insert according to claim 5, wherein the convex shaped portion is dome-shaped.

7. The cutting insert according to claim 5, wherein the first recess is rotationally symmetric.

8. The cutting insert according to claim 5, wherein the first cavity part includes a conical surface.

9. The cutting insert according to claim 5, wherein the first cavity part includes a cylindrical surface.

10. The cutting insert according to claim 5, wherein the insert comprises ceramic material.

11. The cutting insert according to claim 5, wherein the second cavity part comprises two convex-shaped portions and the conically-shaped surface portion is situated between the two convex-shaped surface portions.

12. The cutting insert according to claim 5, comprising a second recess, opposite the first recess, and extending from the other of the upper or the lower surfaces.

13. The cutting insert according to claim 12 comprising a channel extending between the opposing recesses.

* * * * *